Oct. 22, 1940.  W. J. LARSON  2,218,650
METER TESTING JACK
Filed May 16, 1939
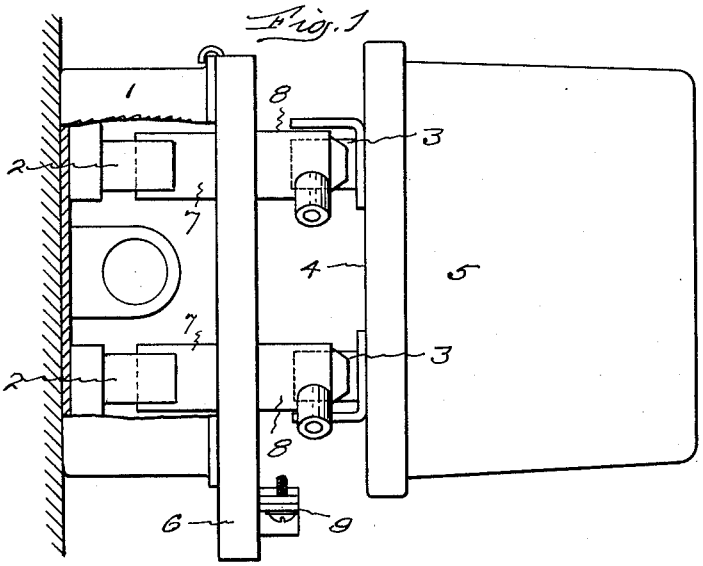
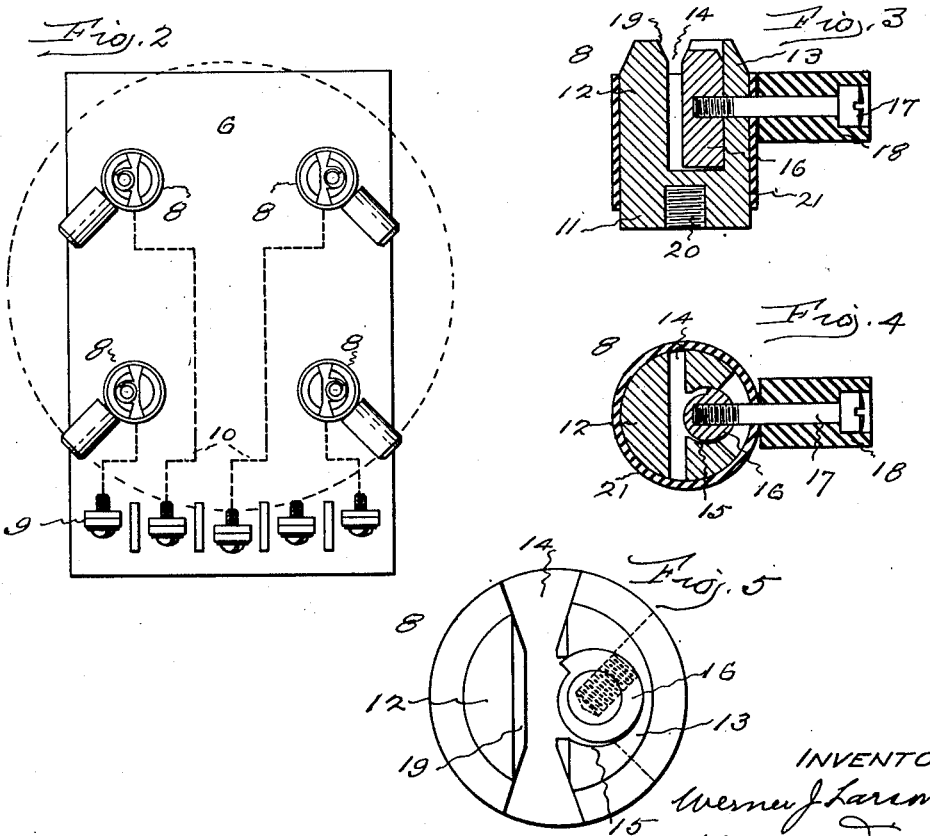
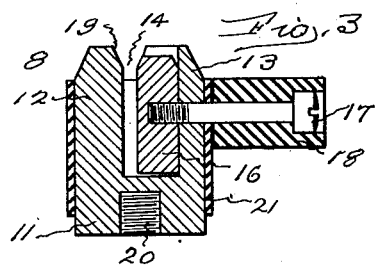
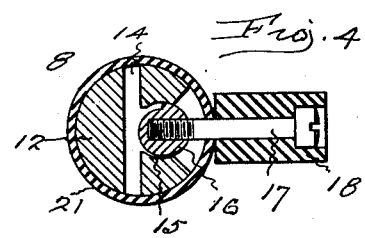
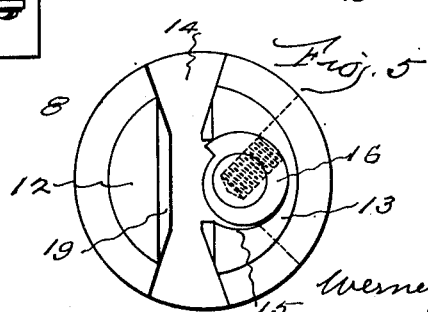
INVENTOR
Werner J. Larson
by Harry P. Williams
Atty.

Patented Oct. 22, 1940

2,218,650

UNITED STATES PATENT OFFICE 2,218,650

METER TESTING JACK

Werner J. Larson, West Hartford, Conn., assignor to The States Company, Hartford, Conn., a Connecticut statute corporation Application May 16, 1939, Serial No. 273,823

6 Claims. (Cl. 173—324)

This invention relates to a testing jack, that is, an apparatus which is adapted to be temporarily placed between an electric meter of the plug-in type and the socket receptacle or outlet box to which the meter is normally attached, for the purpose of facilitating the testing of the meter.

Meters of this type commonly have blades that project rearward from their bases and the sockets have forwardly projecting arms for receiving the meter blades. The testing jacks have on their rear faces blades that will engage the socket arms and on their front faces contacts which will receive the meter blades, so that with the meters removed the jacks may be applied to the sockets and the meters applied to the jacks instead of to the sockets. With a socket attached to a wall and a jack interposed between the socket and meter the heavy meter overhangs or extends outward to such a degree that during test it is in danger of being dislocated and dropping. To obviate this it has been found advisable to provide means for positively fastening the meter blades in the jack contacts into which they are thrust.

The object of the present invention is the provision of jack contacts which will readily receive the meter blades and which will have conveniently located means that may be easily and quickly manipulated to securely bind the meter blades in the jack contacts, and thereby with a minimum of effort and saving of time effect the safe positioning of a meter for test.

In the accompanying drawing Fig. 1 shows a side view of a meter casing, an interposed testing jack that embodies the invention and a socket receptacle with a portion broken away, assembled for test.

Fig. 2 shows a front view of the test jack.

Fig. 3, on larger scale, is a vertical section of a jack contact.

Fig. 4 is a horizontal section of the jack contact.

Fig. 5 on still larger scale shows a front end view of the body and key member of the jack contact.

The socket 1 which is generally fastened to a vertical wall is of a common type with the usual pairs of spring conducting arms 2 that normally receive the blades 3 which project from the base 4 of the meter casing 5.

The test jack which is interposed between the meter casing and socket has a panel 6 of insulating material, with conducting blades 7 that project from its rear face and are adapted to be thrust into the pairs of spring arms 2 in the socket. Projecting from the front face of the panel are the conducting jack contacts 8 designed to receive the meter blades 3. Also on the front face of the panel are means 9 for the attachment of the terminals of circuit and test wires, the wire attaching means being connected by conductors 10 with the proper jack contacts.

The jack contacts are preferably die castings and each has a body 11 and two integral outwardly projecting limbs 12, 13 with a slot 14 between the limbs for receiving the meter blades. The inner face of the limb 13 has a concave recess 15 that extends longitudinally of the limb and parallel with the slot to which it opens. Rotatably located in this recess is a key 16 that in cross section may be eccentric or cam-shaped. Secured to this key by a screw 17 that extends outward through a slot in the side of the limb 13 is a handle 18 by which the key may be turned. The walls of the slot 14 at the front or outer end of the jack contact are beveled, as at 19, as are also the end walls of the key, in order to guide a blade into the slot. The inner end of the body of the jack contact may have a threaded socket 20 for a screw which will fasten the contact to a panel or for the attachment of a conductor leading to a circuit or test terminal. Encircling the contact is an insulating sleeve 21. In the arrangement illustrated with the contacts on a vertically located jack, when the handles are turned up the slots are clear for receiving meter blades but when the handles are turned down the keys are so rotated that their peripheral surfaces will extend into the slots and lock the blades therein. As the meters cover the jacks the jack contacts are more or less concealed and not easily reached, this is particularly the case with many types of meters which have a multiplicity of terminals. With the present invention the contact handles extend outward sufficiently to be conveniently accessible and by a simple flick of the handles the meter blades can be very powerfully locked to the jack contacts or released therefrom, as the conditions require.

The invention claimed is:

1. A device adapted for removable mounting between an electric meter and conducting arms of the supporting socket thereof which are normally engaged by conducting blades on the meter base, the device comprising a panel of insulating material, conducting blades secured to and projecting from the rear face of said panel disposed and arranged for engagement with and retention by said conducting arms, conducting contacts secured to and projecting from the front face of said panel, said contacts each having a distal end and a longitudinal slot open at the distal end, the slots of all said contacts being constructed and arranged to register with and receive the conducting blades on the meter base, and means adjustably associated with said contacts for clamping in the slots thereof, the conducting blades on the meter base whereby a meter may be mounted on the panel.

2. A device adapted for removable mounting between an electric meter and conducting arms of the supporting socket thereof which are normally engaged by conducting blades on the meter base, the device comprising a panel of insulating material, conducting blades secured to and projecting from the rear face of said panel disposed and arranged for engagement with and retention by said conducting arms, conducting contacts secured to and projecting from the front face of said panel, said contacts corresponding in number and arrangement to said conducting blades and having slots registering therewith so as to receive the same, and means operable between the panel and the distal ends of the contacts to secure said conducting blades against accidental detachment from said slots whereby a meter may be mounted on the panel.

3. A device adapted for removable mounting between an electric meter and conducting arms of the supporting socket thereof which are normally engaged by conducting blades on the meter base, the device comprising a panel of insulating material, conducting blades secured to and projecting from the rear face of said panel disposed and arranged for engagement with and retention by said conducting arms, conducting contacts secured to and projecting from the front face of said panel, said contacts each having a distal end and a longitudinal slot open at the distal end, the slots of all said contacts being constructed and arranged to register with and receive the conducting blades on the meter base, each contact on one side of its slot having a recess, a key journaled in each recess having a cam portion to clamp and release the associated conducting blade, and means to operate the keys disposed between the panel and the distal ends of the contacts including parts extending through laterally enlarged slots in the contacts and fastened to the respective keys.

4. A contact comprising a conducting body provided with a distal end, said body being bifurcated and thereby providing longitudinally disposed limbs and a longitudinally disposed slot therebetween open at the said distal end, a key having a clamping part for retraction and projection relatively to the slot surface of one of said limbs to release or clamp a conductor part against that surface, and means functioning to secure the key against displacement extending outwardly through a slot in the other limb for operation to turn the key.

5. A contact comprising a conducting body provided with a distal end, said body being bifurcated and thereby providing longitudinally disposed limbs and a longitudinally disposed slot therebetween open at the said distal end, a key having a clamping part for retraction and projection relatively to the slot surface of one of said limbs to release or clamp a conductor part against that surface, the other limb having a longitudinally extending recess opening into said slot, said key being journaled in said recess, and screw means attached to the last mentioned limb functioning to secure the key against displacement and extending outwardly through a laterally enlarged slot in the last mentioned limb for turning to actuate the key.

6. A contact comprising a conducting body provided with a distal end, said body being bifurcated and thereby providing longitudinally disposed limbs and a longitudinally disposed slot therebetween open at the said distal end, a key having a clamping part for retraction and projection relatively to the slot surface of one of said limbs to release or clamp a conductor part against that surface, the other limb having a longitudinally extending recess opening into said slot, said key being journaled in said recess, a sleeve of insulation disposed around the contact and overlapping opposite sides of the slot, a rod passing through said sleeve and a laterally enlarged slot in the last mentioned limb, the inner end of said rod being attached to said key, and a handle of insulation on said rod outwardly of said sleeve to facilitate operation to turn the key.

WERNER J. LARSON.